US010051527B2

(12) United States Patent
John et al.

(10) Patent No.: US 10,051,527 B2
(45) Date of Patent: Aug. 14, 2018

(54) SYSTEMS AND METHODS FOR EVOLVED PACKET CORE CLUSTER AND SESSION HANDLING

(71) Applicant: Futurewei Technologies, Inc., Plano, TX (US)

(72) Inventors: Kaippallimalil Mathew John, Richardson, TX (US); Khosrow Tony Saboorian, Plano, TX (US); Hinghung Anthony Chan, Plano, TX (US); Zhixian Xiang, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 310 days.

(21) Appl. No.: 15/016,114

(22) Filed: Feb. 4, 2016

(65) Prior Publication Data
US 2016/0234730 A1 Aug. 11, 2016

Related U.S. Application Data

(60) Provisional application No. 62/131,502, filed on Mar. 11, 2015, provisional application No. 62/114,858, filed on Feb. 11, 2015.

(51) Int. Cl.
*H04W 36/00* (2009.01)
*H04W 36/38* (2009.01)
(Continued)

(52) U.S. Cl.
CPC ....... *H04W 36/0033* (2013.01); *H04W 76/10* (2018.02); *H04W 8/065* (2013.01);
(Continued)

(58) Field of Classification Search
CPC . H04W 36/0033; H04W 76/02; H04W 36/12; H04W 88/16; H04W 76/10; H04W 36/0072
See application file for complete search history.

(56) References Cited

U.S. PATENT DOCUMENTS

| 2008/0137595 A1* | 6/2008 | Surazski ............. H04W 76/022 370/329 |
| 2010/0281151 A1 | 11/2010 | Ramankutty et al. |
| 2013/0132545 A1* | 5/2013 | Schultze ................. H04L 41/00 709/223 |

FOREIGN PATENT DOCUMENTS

| CN | 103702368 A | 4/2014 |
| CN | 103906257 A | 7/2014 |

(Continued)

OTHER PUBLICATIONS

"3rd Generation Partnership Project; Technical Specification Group Core Network and Terminals; Non-Access-Stratum (NAS) protocol for Evolved Packet System (EPS); Stage 3 (Release 13)," 3GPP TS 24.301 V13.0.0. Dec. 2014, 374 pages.

*Primary Examiner* — Gbemileke J Onamuti
(74) *Attorney, Agent, or Firm* — David Roe

(57) ABSTRACT

System and method embodiments are provided for evolved packet core cluster and session handling. In an embodiment, a method in a network component for cluster and session handling includes receiving, by a MC-C in a first resource pool in a cluster of resources, an attach request from a SORC for a PDN connection for a UE, the MC-C and the first resource pool selected by the SORC according to a UE address, a resource load, and an operator policy; configuring session control and gateway resources for a session for the UE; negotiating with a follower site to determine state information for a bearer context of the UE; synchronizing the state information with follower sites when a state is agreed upon by at least some of the follower sites; and forming an availability group according to a set of servers that hold replicated state information for the UE.

20 Claims, 17 Drawing Sheets

(51) Int. Cl.
*H04W 76/10* (2018.01)
*H04W 88/16* (2009.01)
*H04W 36/12* (2009.01)
*H04W 8/06* (2009.01)

(52) U.S. Cl.
CPC ........ *H04W 36/0072* (2013.01); *H04W 36/12* (2013.01); *H04W 88/16* (2013.01)

(56) References Cited

FOREIGN PATENT DOCUMENTS

EP 2785004 A1 10/2014
WO 2012160465 A1 11/2012

\* cited by examiner

SYSTEMS AND METHODS FOR EVOLVED PACKET CORE CLUSTER AND SESSION HANDLING

This application claims the benefit of U.S. Provisional Application No. 62/131,502, filed on Mar. 11, 2015 and U.S. Provisional Application No. 62/114,858, filed on Feb. 11, 2015, whose applications are hereby incorporated by reference.

TECHNICAL FIELD

The present invention relates to core networks, and, in particular embodiments, to a system and method for evolved packet core cluster and session handling.

BACKGROUND

The 5G network core needs to provide session and connection handling support for a wide range of applications. In addition to 4G Long Term Evolution (LTE)/evolved packet core (EPC) services, services like machine-to-machine (M2M), Internet of things (IoT), V2V, and cognitive assistance require significant additional resources and support from the network. Some applications need far less capability in the EPC network. Some (e.g., M2M) services do not require mobility support since they are embedded into infrastructure, or otherwise not mobile. Many (e.g., M2M, IoT) services have high tolerance for latency. Some services (e.g., cognitive assistance, vehicle-to-vehicle (V2V), remote surgery) require ultrahigh reliability, perhaps geo redundancy, low latency and low jitter requirements. In EPC networks where the Internet protocol (IP) gateway is distributed, IP mobility support is required for some services.

SUMMARY

An embodiment method in a network component for cluster and session handling includes receiving, by a mobile core controller (MC-C) in a first resource pool in a cluster of resources, an attach request from a service-oriented radio controller (SORC) for a packet data network (PDN) connection for a user equipment (UE), the MC-C and the first resource pool selected by the SORC according to a UE address, a load experienced by the cluster of resources, and at least one operator policy; configuring, by the MC-C, session control and gateway resources for a session for the UE, the selection of session control received by the MC-C from the SORC; negotiating, by the MC-C, with a follower site to determine state information for a bearer context of the UE, the follower site comprising a second resource pool belonging to the cluster of resources; synchronizing, by the MC-C, the state information with follower sites when a state is agreed upon by at least some of the follower sites; and forming an availability group according to a set of servers that hold replicated state information for the UE.

An embodiment mobile core controller (MC-C) in a first resource pool in a cluster of resources, the MC-C includes a processor and a non-transitory computer readable storage medium storing programming for execution by the processor, the programming including instructions to: receive an attach request from a service-oriented radio controller (SORC) for a packet data network (PDN) connection for a user equipment (UE), the MC-C deployed in a first resource pool in a cluster of resources, the MC-C and the first resource pool selected by the SORC according to a UE address, a load experienced by the cluster of resources, and at least one operator policy; configure session control and gateway resources for a session for the UE, the selection of session control received by the MC-C from the SORC; negotiate with a follower site to determine state information for a bearer context of the UE, the follower site comprising a second resource pool belonging to the cluster of resources; synchronize the state information with follower sites when a state is agreed upon by at least some of the follower sites; and form an availability group according to a set of servers that hold replicated state information for the UE.

An embodiment method in a network component for evolved packet core (EPC) cluster and session handling includes receiving, at the network component, an attach request for a packet data network (PDN) connection from a user equipment (UE); determining, by the network component, resource load for resources in a cluster of resources; determining a pool of resources to serve the UE according to the resource load, a location of the UE, and at least one operator policy; selecting session control for the PDN connection; identifying a mobile core controller (MC-C) from the determined pool or resources; sending the selection control to the MC-C; and instructing the MC-C to initiate procedures to authenticate the UE, set up gateway resources from the pool of resources, and perform UE context replication among the pool of resources according to the pool of resources and the session control.

An embodiment network component includes a processor and a non-transitory computer readable storage medium storing programming for execution by the processor, the programming including instructions to: receive an attach request for a packet data network (PDN) connection from a user equipment (UE); determine a resource load for resources in a cluster of resources; determine a pool of resources to serve the UE according to the resource load, a location of the UE, and at least one operator policy; select session control for the PDN connection; identify a mobile core controller (MC-C) from the determined pool or resources; send the selection control to the MC-C; and instruct the MC-C to initiate procedures to authenticate the UE, set up gateway resources from the pool of resources, and perform UE context replication among the pool of resources according to the pool of resources and the session control.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
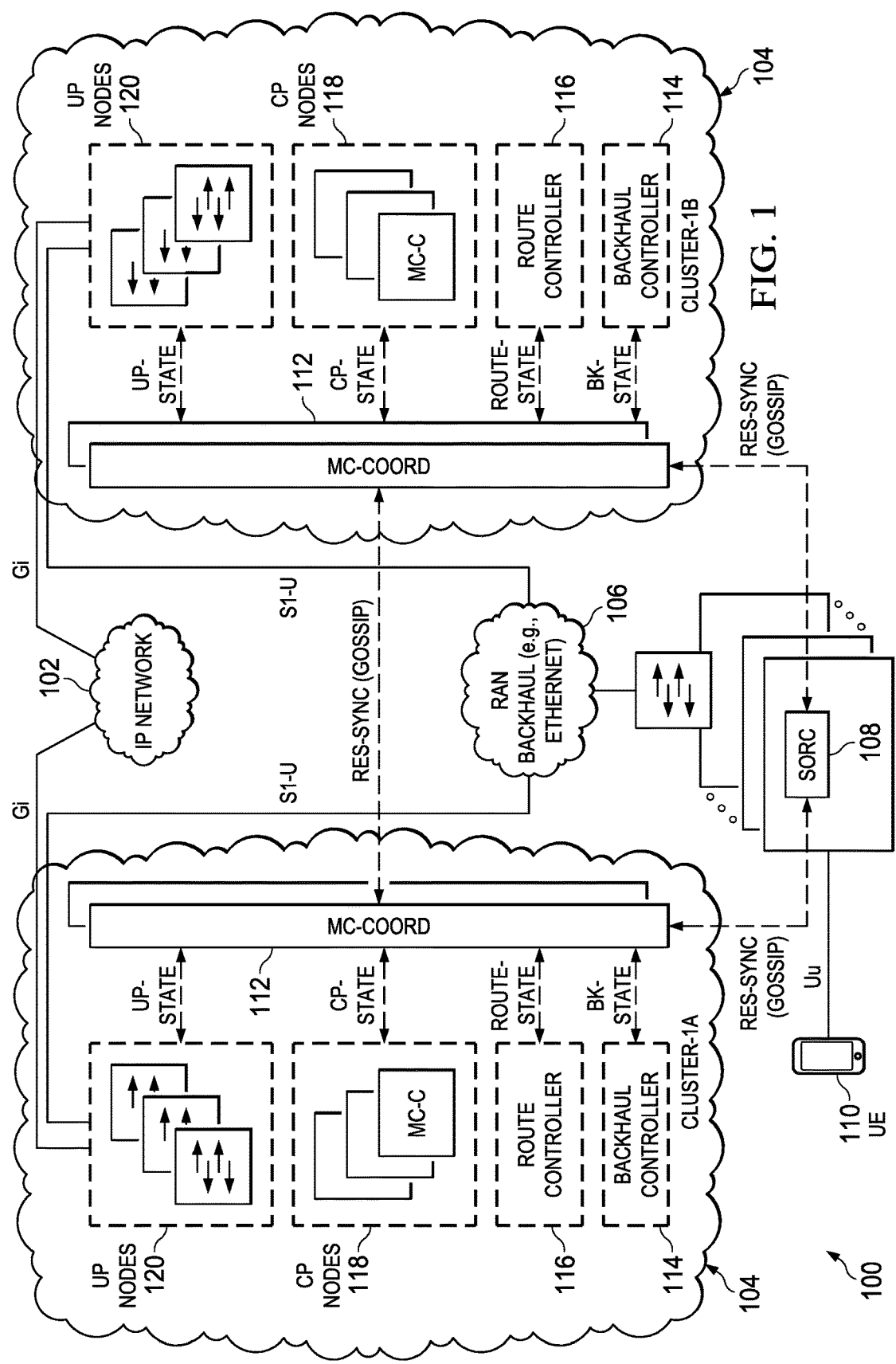
FIG. 1 illustrates an embodiment of a mobile core cluster and resource pools.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

To support low latency, the IP edge is moved close to the enhanced node B (eNB), and as a result, there needs to be IP mobility support for those applications that need it. Other applications require additional reliability, which in this virtualized architecture can be addressed by replication of resources and coordination. An embodiment addresses resource handling, context replication and application layer extensions for supporting low latency, IP mobility and high reliability sessions on a demand basis.

An embodiment exchanges resource information in the network, including backhaul information, IP routes information, compute information, and gateway information. This information, along with a configured network policy, is used to discover, select and balance a load. An embodiment method for user equipment (UE) context replication allows failover across geographically separate sites. Embodiment EPC extensions are used to inform and coordinate with third party applications. Embodiment call flows outline the use of the above for attaching, failover and IP mobility within a cluster.

An embodiment method for initial attach of a user equipment (UE) includes a service-oriented radio controller (SORC) receiving an attach request from the UE, selecting a mobile core mobility management entity (MME) in a mobile core cluster in accordance with an identity of the UE and a resource load in the mobile core cluster, directing the attach request to the mobile core MME in accordance with the selecting, receiving an attach accept/activate bearer context from the mobile core MME, and activating the bearer context to set up a packet data network connection for the UE.

An embodiment SORC includes a processor and a non-transitory computer readable storage medium storing programming for execution by the processor. The programming includes instructions for receiving an attach request from a UE, selecting a mobile core MME in a mobile core cluster in accordance with an identity of the UE and a resource load in the mobile core cluster, directing the attach request to the mobile core MME in accordance with the selecting, receiving an attach accept/activate bearer context from the mobile core MME, and activating the bearer context to set up a packet data network connection for the UE.

The current EPC is centralized and does not address distributed core resource issues. In distributed EPC, an embodiment allocates and utilizes network resources more efficiently. An embodiment exposes network capabilities to applications and coordinates events. Embodiments may be implemented in, for example, mobile core networks such as 5G mobile core networks, 3GPP related networks, and the like.

In contrast to prior art methods, embodiments of the disclosed SORC selects the appropriate MC-C instance/cluster based on address (e.g., international mobile subscriber identity (IMSI)), load and operator policies. In the prior art EPC, the MME is selected based on domain name system (DNS) resolution and IMSI. In the prior art, there is a crude way of distributing load information using S1 responses. However, in contrast to the prior art, in the disclosed systems and methods, the system load is dynamically distributed among all members of the cluster—the mobility core controller (MC-C) and eNB. Furthermore, in disclosed embodiments, operator policy is also signaled to the MC-C and eNB. In contrast to the disclosed systems and methods, the prior art configures the operator policy at each eNB, which is less dynamic and inefficient as it does not allow the resources to be utilized differently and more efficiently based on changing network conditions.

Various embodiments described below address the following areas: resource handling (discovery, selection and balancing), UE context replication, and EPC extensions and third party application coordination.

With respect to resource handling, the general architecture and distribution are based on [1]. In various embodiments, resources are discovered, resources are selected for a session, and loads are balanced.

FIG. 1 illustrates an embodiment system 100. FIG. 1 illustrates a collection of mobile core and radio resource pools that form a cluster. System 100 is a cluster that includes a plurality of mobile core resource pools 104 (labeled cluster-1A and cluster-1B), one or more service oriented radio controllers (SORCs) 108 labeled 1-N, an IP network 102, a radio access network (RAN) backhaul 106, and a UE 110. Within system 100, there are multiple resource pools 104, including control plane nodes (MC-C/CP nodes) 118 and user plane nodes (UP nodes) 120. Each mobile core resource pool 104 includes a mobile core coordinator (MC-COORD) 112, a backhaul controller, and a route controller 116. The UP nodes 120 and CP nodes 118 communicate the availability of their resources to the mobile core coordinator (MC-COORD) 112, for example, by using a gossip protocol. The MC-COORD 112 also is informed of the availability of backhaul and IP route resources.

The MC-COORD 112 in each mobile core resource pool 104 (e.g., CLUSTER-1A) gossips (i.e., exchanges information regarding availability and capability of resources) with other pools (e.g., CLUSTER-1B) 104 and SORCs 108 in the system 100 and learns state and availability of resources. The SORC 108 uses this information along with preconfigured policies to make a decision on directing an initial attach request from the UE 110 (note that in current 4G, these are configured or resolved using the domain name system (DNS), both of which are not flexible).

The MC-COORD 112 also keeps track of availability and detects failures between core sites. For example, ultra-reliable sessions may need to survive the failure of an entire site. This may be only a small fraction of the total number of sessions supported (perhaps 10%). To support such geo-redundancy, the security context and bearer contexts are replicated and backhaul and network resources are reassigned, as discussed below.

Note that only two mobile core resource pools 104 are shown in FIG. 1. However, in many embodiments, the pools are likely to be three or more, generally corresponding roughly to the formula (2f+1), where f=the number of failures.

With respect to UE context replication, in an embodiment, a UE session is identified by its international mobile subscriber identity (IMSI), and includes the non-access stratum (NAS) security context, one or more packet data network (PDN) connections, and bearers associated with a PDN connection.

Figure 2:
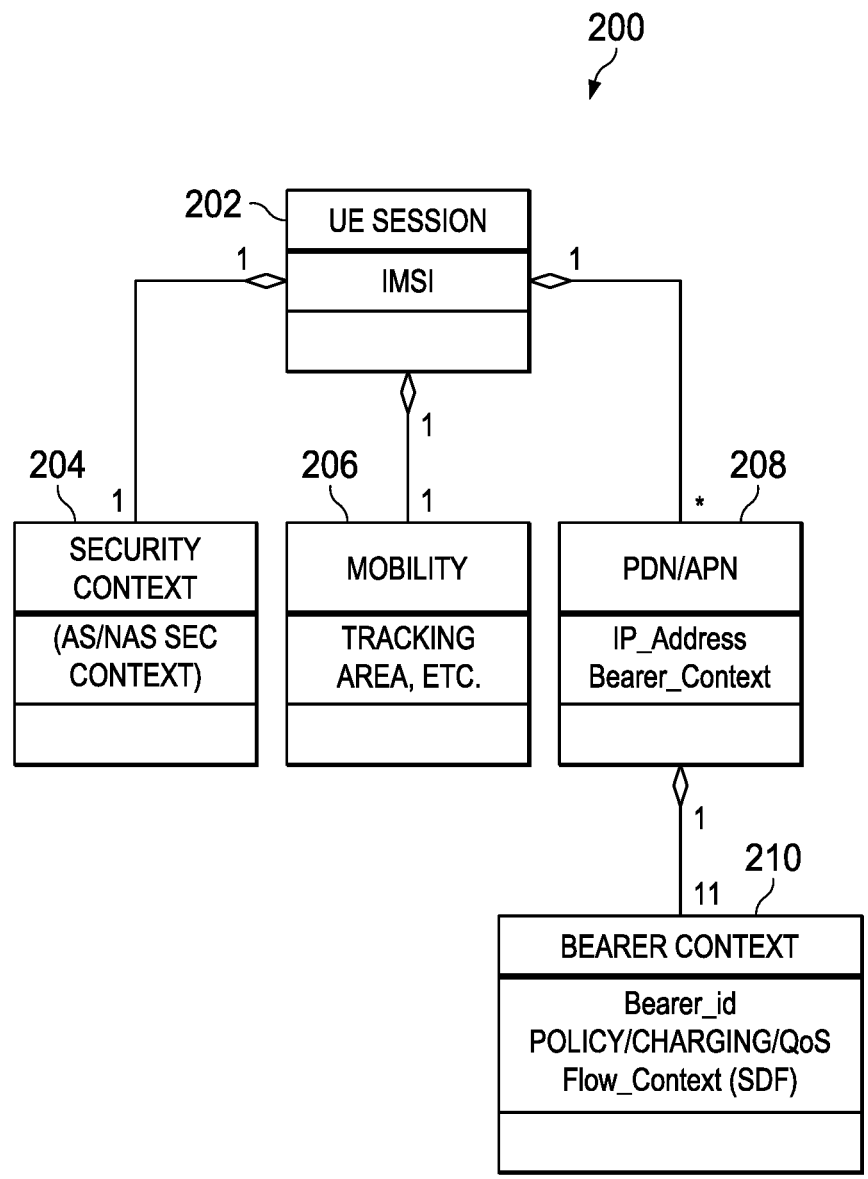
FIG. 2 illustrates an embodiment of a UE session context.

FIG. 2 illustrates an embodiment of a UE session context 200. The data (corresponding to data structures in FIG. 2) is stored in the MC-C for each UE as the session and connections are established. In an embodiment, the UE session context 200 includes UE session information 202, security context information 204, mobility information 206, PDN/APN information 208, and bearer context information 210. When a UE starts attach procedures, the mobile core (mobility management entity (MME) function) verifies the authenticity of the user with the home subscriber server (HSS) and sets up a security context. This security context is handled by the MC-C/CP node in a mobile core cluster.

Figure 3:
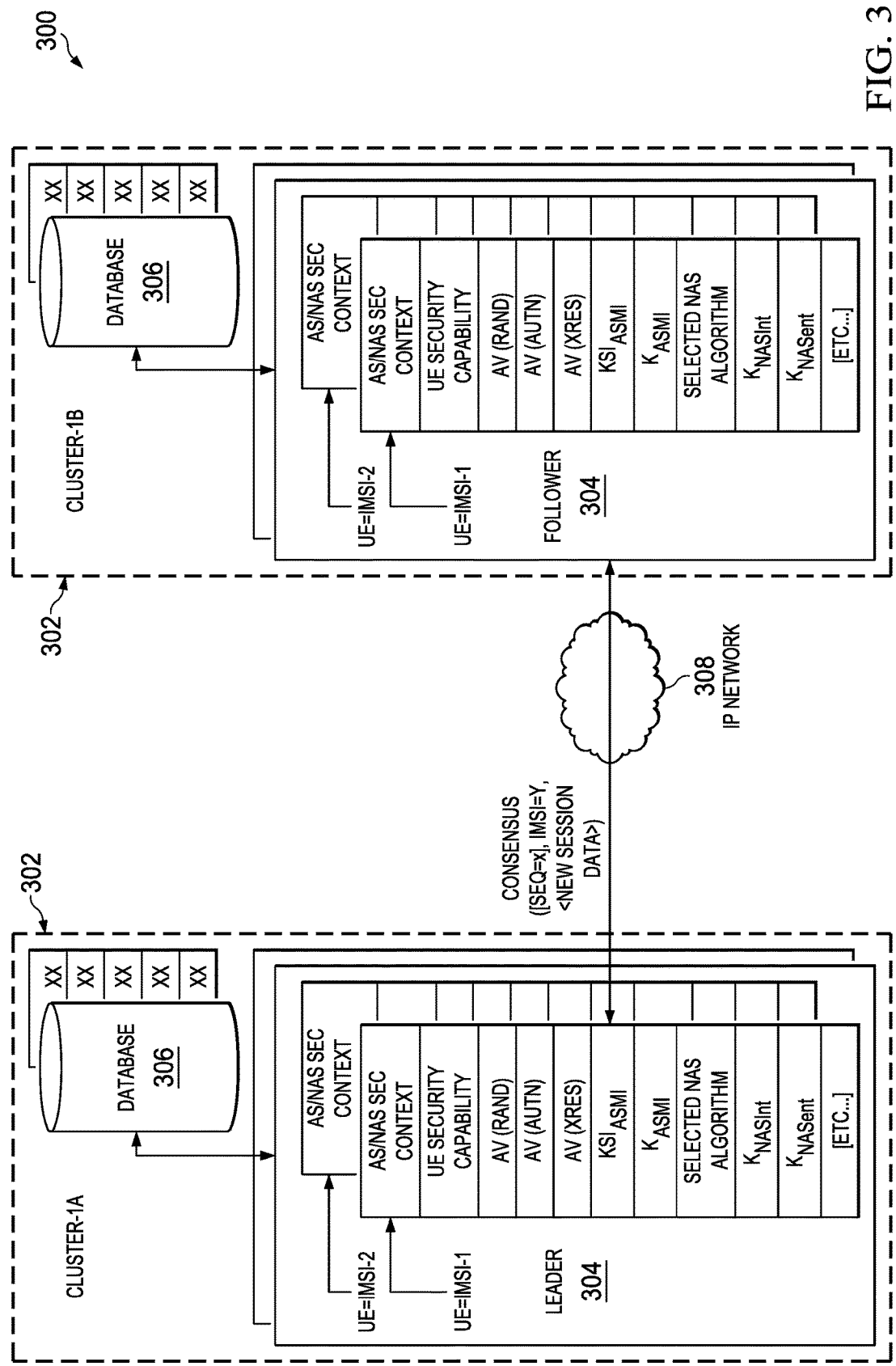
FIG. 3 illustrates an embodiment of a UE security context replication.

FIG. 3 illustrates an embodiment of a system 300 for UE security context replication. System 300 includes two mobile core resource pools 302 (labeled Cluster-1A and Cluster 1-B). Each mobile core resource pool 302 includes a database 306 that includes security information 304. The mobile resource pools 302 exchange information over an IP network 308. In the depicted example, an entity in Cluster-1A is the leader and an entity in Cluster 1-B is the follower. Within a resource pool 304, the state may be saved to a database 306 as shown in FIG. 3, or some other mechanism such as consensus-based log replication may be used. For managing failover between resource pools/sites, the techniques described below are used.

For sessions that require ultra-high reliability or a similar requirement, replication is performed. The resource pool 304 that handles the initial attach is a leader, and entities in other pools/sites are followers. FIG. 3 shows two entities, but typically there are (2f+1) in total with one leader and other followers. When the followers (or a quorum within) agree on the state (with signaling as shown FIG. 4A and FIG. 4B), the state is synchronized across resource pools. The set of servers that hold the replicated state of the UE context form an availability group.

Figure 4A:
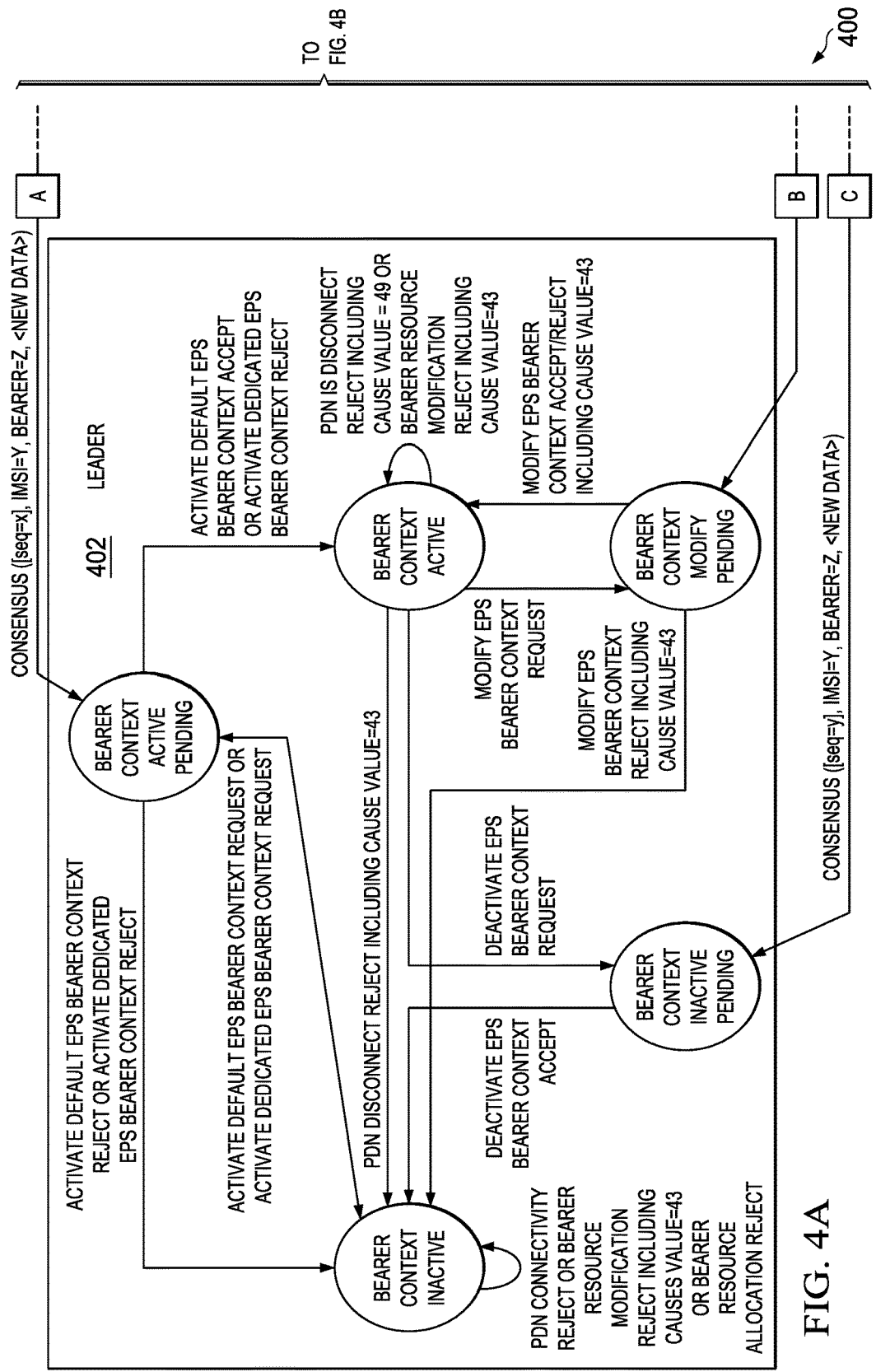
FIG. 4A and FIG. 4B illustrate an embodiment of a bearer context replication.
Figure 4B:
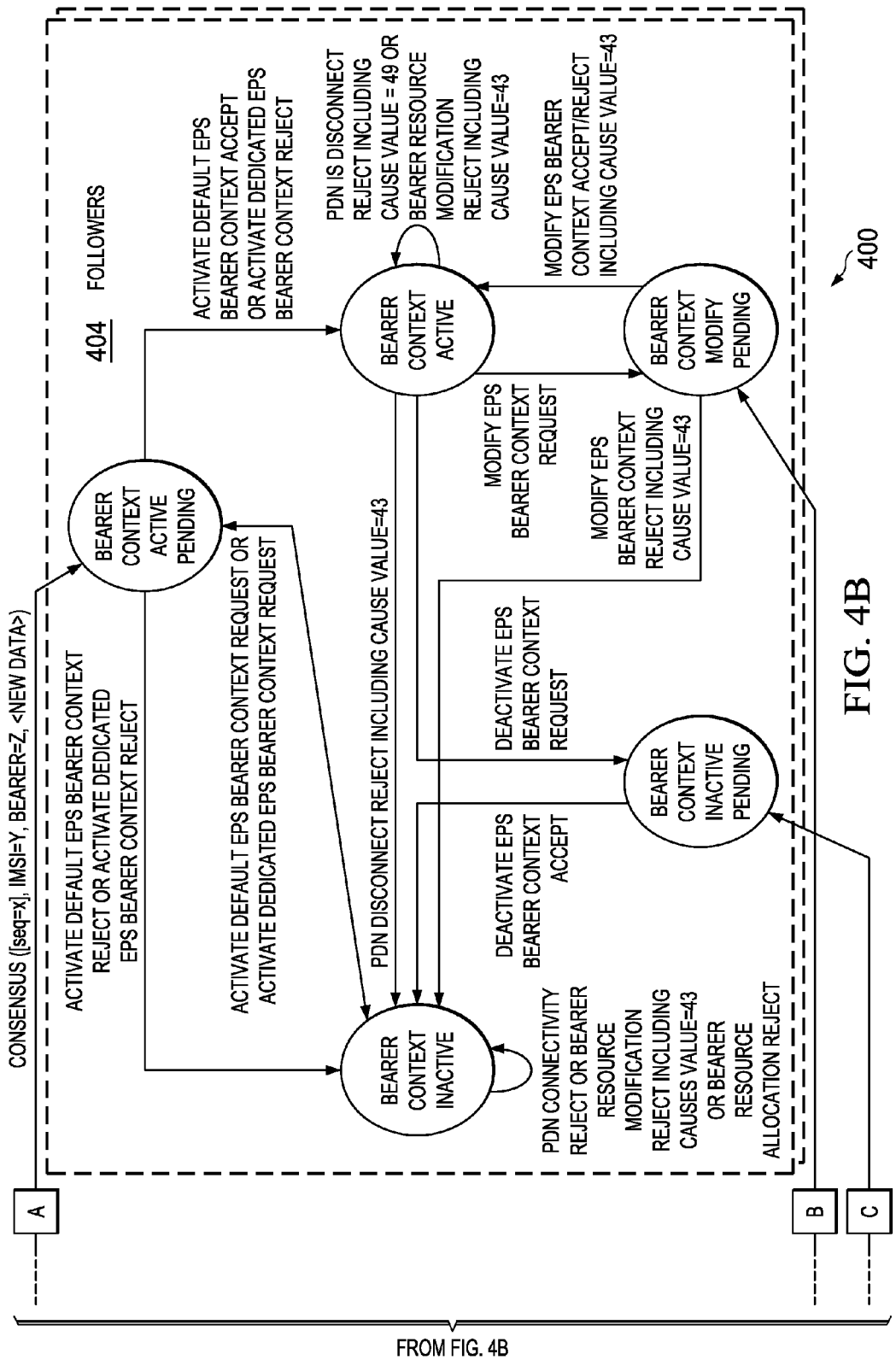

FIG. 4A and FIG. 4B illustrate an embodiment system 400 of two or more entities 402, 404 performing bearer context replication, where entity 402 is the leader and the other entities 404 are followers. PDN connection and bearer state are replicated in a similar manner as the connections are signaled. In an embodiment, generally, these replications are triggered only if there is a need for geographical redundancy or failover across sites in a cluster.

For bearers of a UE that need to be replicated, when the bearer state is in BEARER CONTEXT ACTIVE PENDING, BEARER CONTEXT MODIFY PENDING or BEARER CONTEXT INACTIVE PENDING, refer to reference [1] identified below.

If the MC-COORD detects failure of a resource pool, it notifies the MC-C servers in the pool. The servers of the availability group that are alive elect a new leader. The MC-C server/leader is responsible for establishing or migrating IP addresses and backhaul routes. In the case of backhaul routes, the SORC migrates routes to the new server/MC-C in the group, since all nodes in the cluster run the same policy and discover the failed nodes and newly elected nodes.

With respect to EPC $3^{rd}$ party application coordination, when an application (or application proxy) is interested in session level information—such as location information, congestion, failure events or triggers for IP mobility—it subscribes to services that the session layer exposes.

Figure 5:
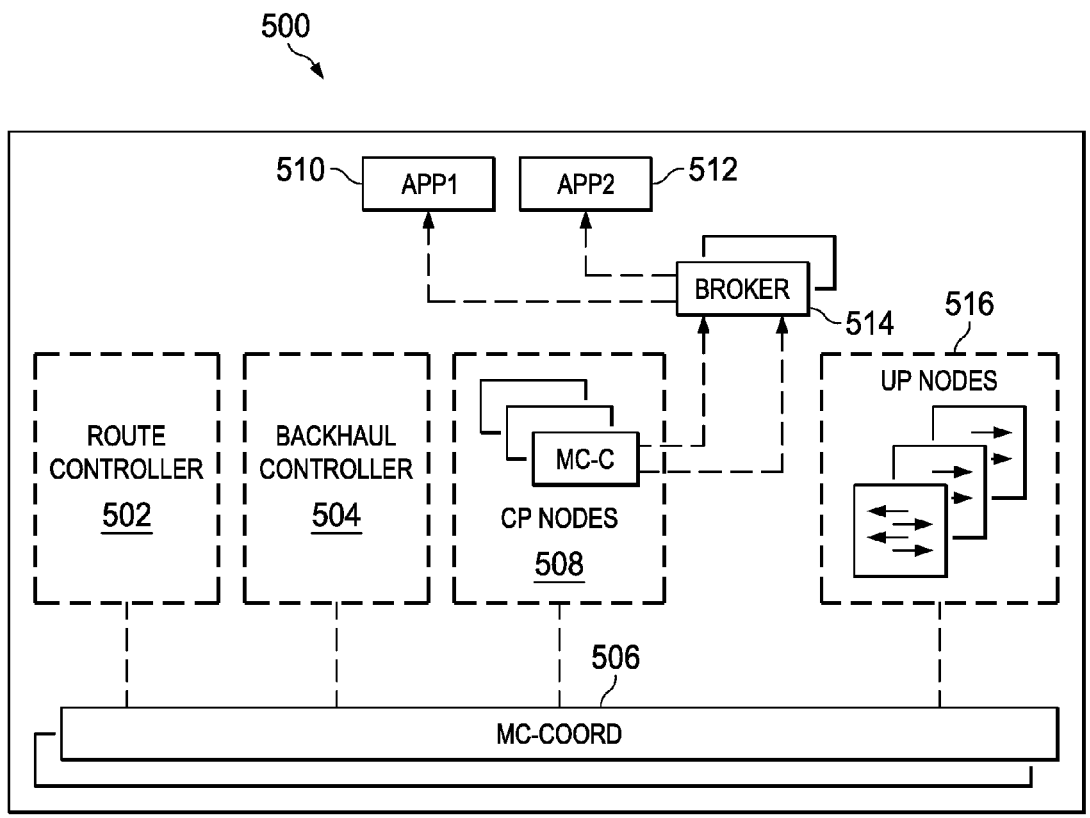
FIG. 5 illustrates an embodiment of service exposure.

FIG. 5 illustrates an embodiment of a mobile core system 500 for service exposure. System 500 includes a MC-COORD 506, a router controller 502, a backhaul controller 504, one or more MC-C/CP nodes, one or more UP nodes 516, one or more brokers 514, and applications App1 510 and App2 512. The MC-C (mobile core control) 508 can expose information related to a session, thus allowing the application to act appropriately. For example, if a mobility event is triggered by the UE or MC-C and the application learns via a notification, it can proactively setup context for the new site/cluster and migrate the application as the UE moves. Discovering based on input from the UE is more reactive since the network has more precise information on session related resources.

The mobile core 500 advertises session services to an application using PUBLISH <mpc-service>. An application 510, 512 subscribes to service of interest using SUBSCRIBE <mpc-service>. The MP-C 508 notifies the application 510, 512 of events using NOTIFY <mpc-service>. The application 510, 512 also may use other patterns such as request/response for interaction. Some services that applications may subscribe to include relocation, resource-state information, charging and online charging.

In an embodiment, relocation includes (<start relocation> new-cluster, VM-migrate-ind, [server-addr]) and (<finalize relocation>). Start relocation with relevant information can initiate processes in the application layer to replicate context and be ready for migrating the server when the user completes the move. Finalize relocation indicates that the UE has moved and relocation should be completed.

In an embodiment, resource-state information includes (<res-state> congestion, failure, . . . ). Session specific information on path congestion or failure can provide active feedback for the application to take action. Charging includes (<chg> cost/preference, units/metrics). This may be an indication of the cost of using resources. The application may at some cost level prefer to use other resources. Online charging includes (<ocs> tokens, basis (time/volume/rate).

Call flows for initial attach, failover, and intra-cluster mobility are described below.

Figure 6:
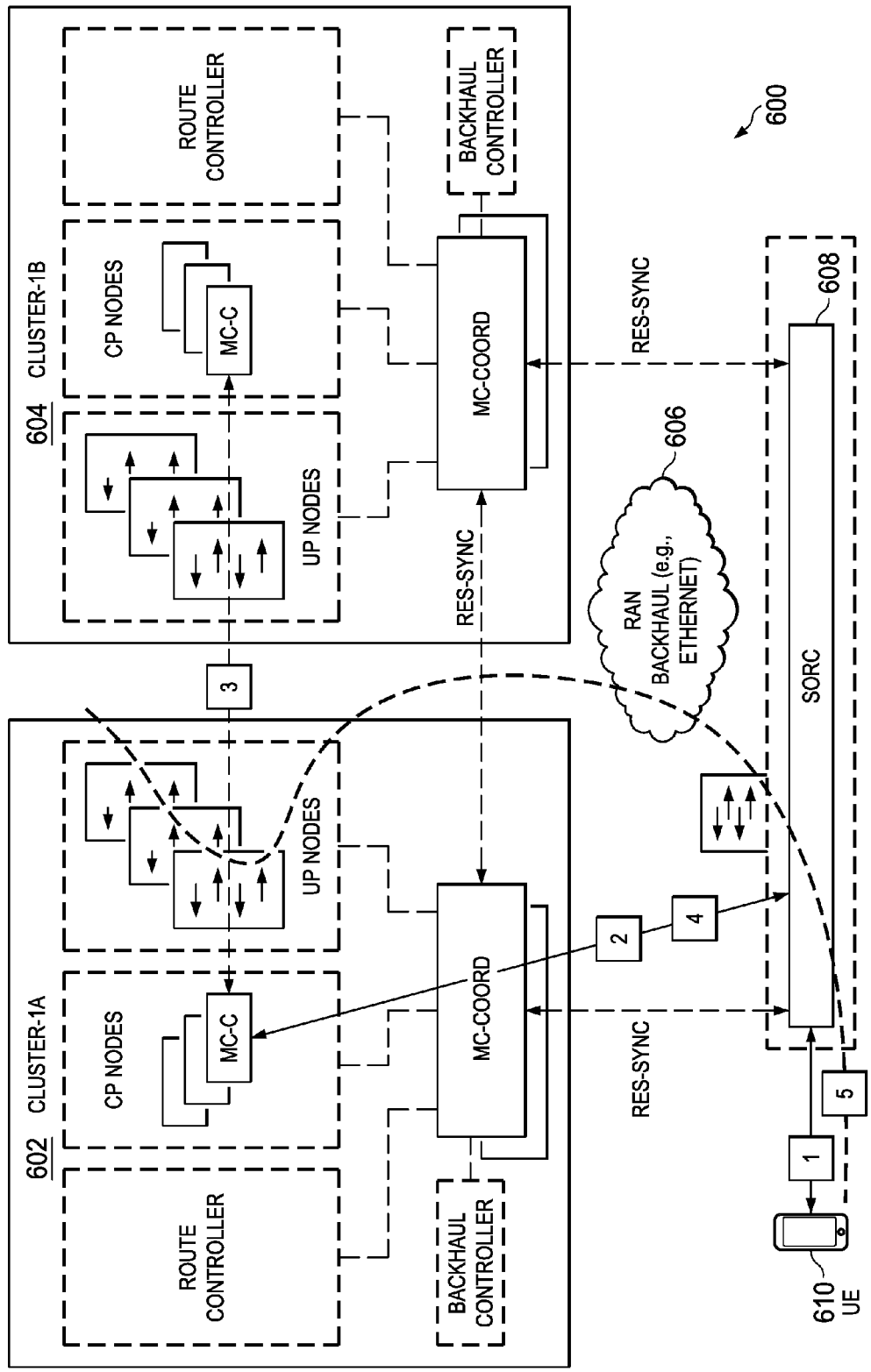
FIG. 6 illustrates an embodiment of a method for initial attach with UE context replication.

FIG. 6 is a diagram of an embodiment system 600 that illustrates an initial attach with UE context replication. The system includes cluster-1A 602, cluster-1B 604, a RAN backhaul 606, a SORC 608, and a UE 610. System 600 is similar to system 100 described above. In step 1 (initial), an attach request from the UE 610 is received by SORC (eNB) 608. In step 2, SORC 608 determines an MME based on IMSI and resource load in cluster. For example: (IMSI, GUMMEI=0, M-TMSI=0, Load, Policy)→mmeid.resgroupID.mmeid.clusterid. This is resolved by DNS (in this case to the address of MC-C in CLUSTER-1A).

In step 3, the MC-C (MME function) starts procedures to authenticate the UE. Following authorization, it sets up gateway resources (UP Nodes in FIG. 6). If the session requested requires resiliency, the UE context is replicated as described above with respect to UE context replication.

In step 4 the MC-C responds with attach accept/activate bearer context. In step 5, following bearer context activation, the PDN connection is setup and ready for data transmission.

Figure 7:
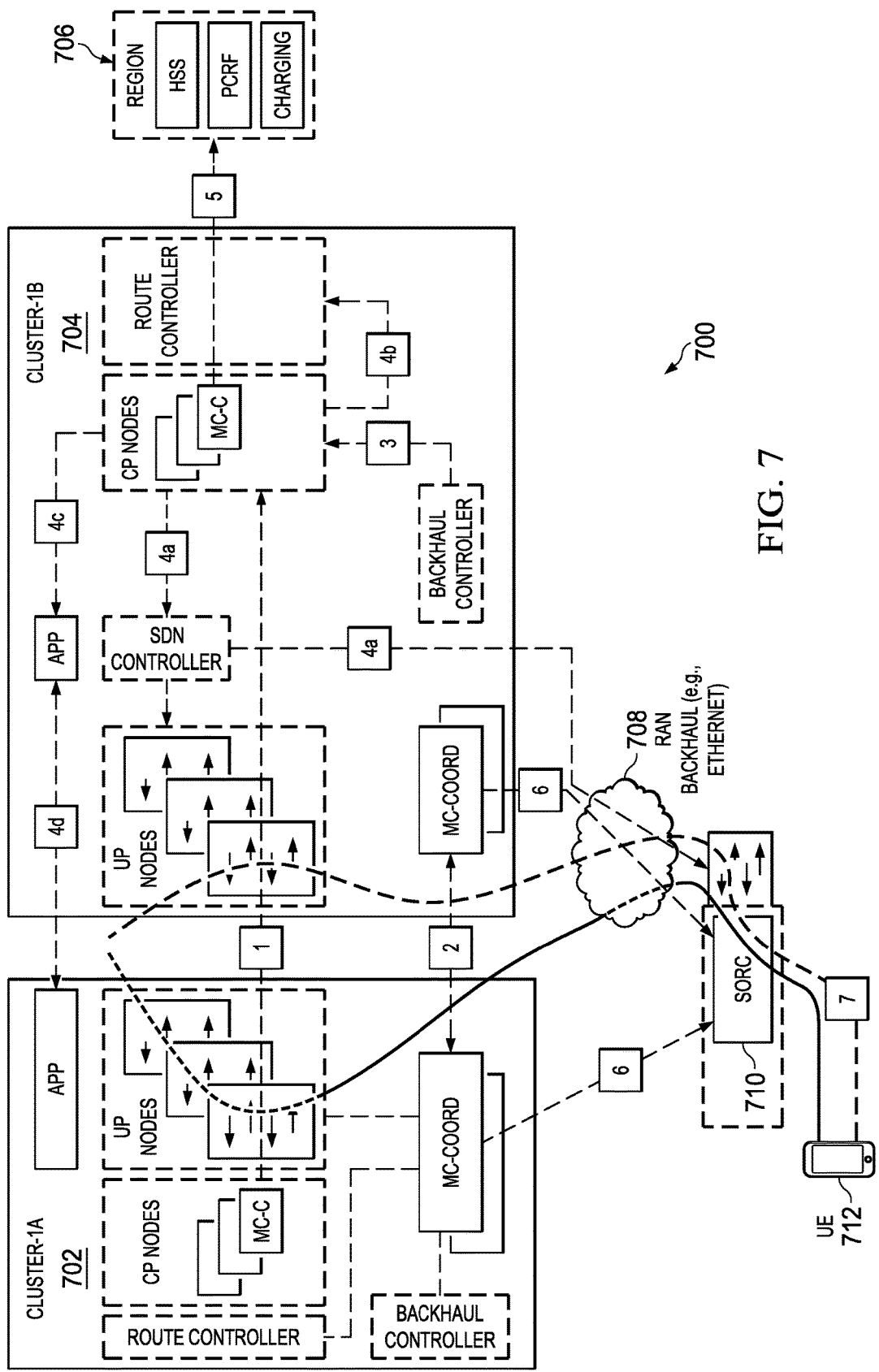
FIG. 7 illustrates an embodiment of failover of sessions with replicated context.

FIG. 7 is a diagram of a system 700 that illustrates failover of sessions with replicated context. System 700 includes cluster-A 702, cluster 1-B 704, region 706, RAN backhaul 708, SORC 710, and UE 712. The region 706 includes HSS, PCRF and Charging. System 700 is similar to systems 100 or 600. In step 1, the MC-C replicates the state of UE context between sites: Cluster-1A 702 and Cluster-1B 704. If the PDN requires reliability support, the entire state is replicated.

In step 2, coordinators in each site 702, 704 monitor the state. In this case CLUSTER-1B (MC-COORD, or signaling among nodes in a group) notices that there is a partial (or full) failure of resources. In step 3, notification is provided to the MC-C to initiate session failover procedures.

In step 4, for a reliable PDN connection, the state is transferred as follows:
(a) gateway states (at MC site and radio) are modified by the software defined network (SDN) controller to handle PDN; (b) the route controller syncs with CLUSTER-1A (if active) and injects route to upstream routers to handle the IP address of the UE's reliable PDN; and (c) the MC-C signals applications subscribed of migration, address, etc. Following completion of connection setup, <finalize relocation> is sent to the application.

In step 5, HSS, PCRF and charging servers references are updated to the new EPC site/cluster. In step 6, coordinators notify SORC of the new resource state (i.e., failure in CLUSTER-1A). An algorithm to route requests sends new control and data to CLUSTER-1B.

In step 7, PDN data flow (and signaling) is now routed via CLUSTER 1B.

Figure 8:
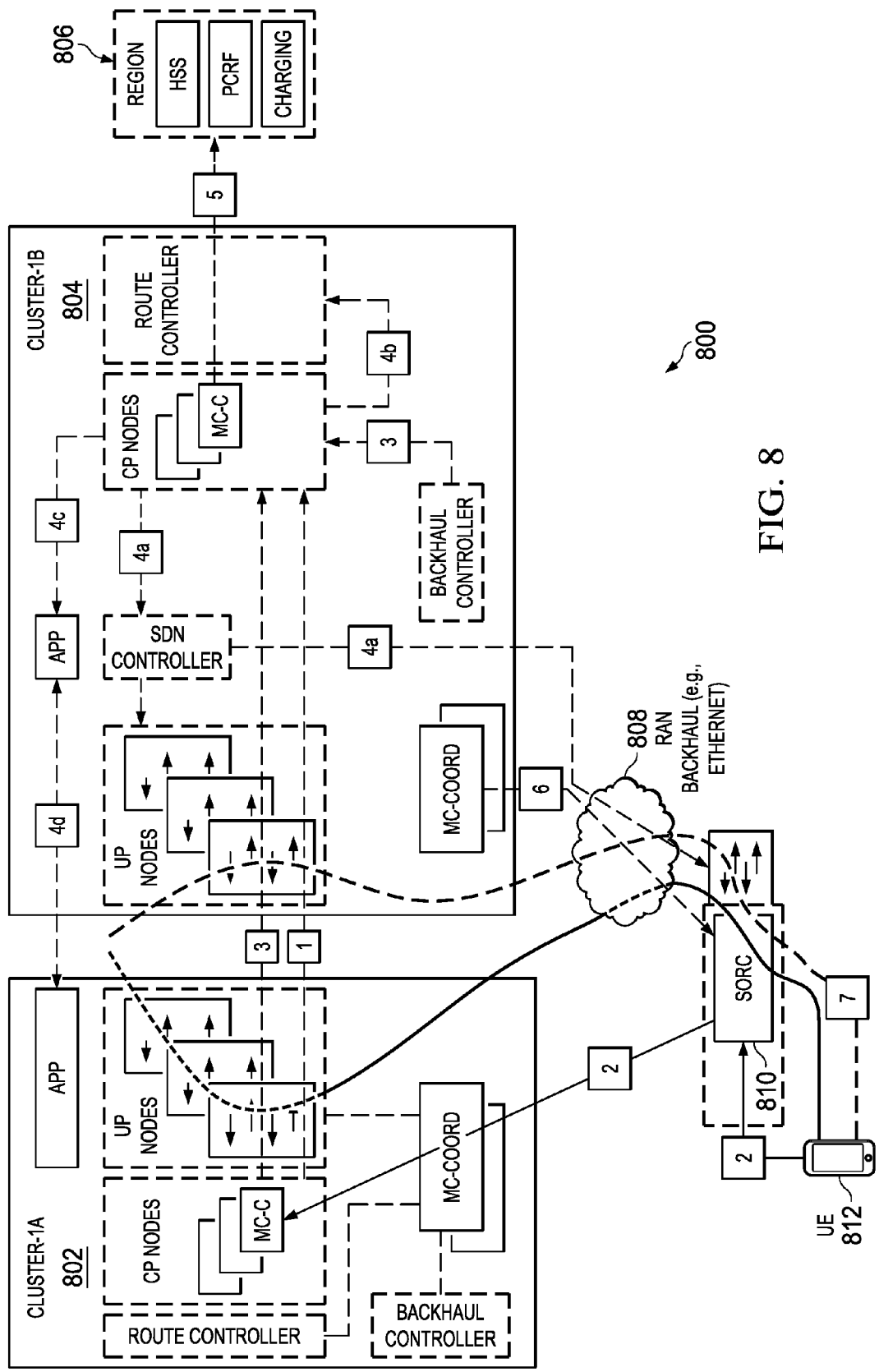
FIG. 8 illustrates an embodiment of IP mobility within a cluster.

FIG. 8 is a diagram of a system 800 that illustrates intra-cluster mobility. System 800 includes cluster-1A 802, cluster-1B 804, region 806, RAN backhaul 808, SORC 810, and UE 812. System 800 is similar to systems 100, 600, and 700 described above. IP mobility within the cluster is similar to failover in some ways. However, the trigger for moving the session from one site/resource group to another is as a result of the UE moving.

In step 1, if the PDN requires reliability support, the entire state is replicated. If a session that has no replication moves, the state can be transferred on demand.

In step 2, after a decision is made to initiate handover (SORC-UE), the UE sends a handover required message to the mobile core.

In step 3, if the session has no replication, the UE session context is copied from 1A to 1B. For all cases, a notification to the MC-C to initiate the IP session mobility procedures is sent. The MC-C signals applications with <start relocation> to start migrating application state.

In step 4, the PDN connection and bearer state is transferred as follows: (a) gateway states (at the MC site and radio) are modified by the SDN controller to handle PDN; (b) the route controller syncs with CLUSTER-1A and injects route to upstream routers to handle the IP address of the UE's reliable PDN; and (c) the MC-C signals applications subscribed of migration, address, etc. Following completion of connection setup, <finalize relocation> is sent to the application.

In step 5, the HSS, PCRF and charging servers references are updated to the new EPC site/cluster. In step 6, coordinators notify SORC of the new resource state (i.e., failure in CLUSTER-1A). An algorithm to route requests sends new control and data to CLUSTER-1B.

In step 7, signaling for completing handover is performed. At this point, PDN data flow (and signaling) is routed via CLUSTER 1B.

Figure 9:
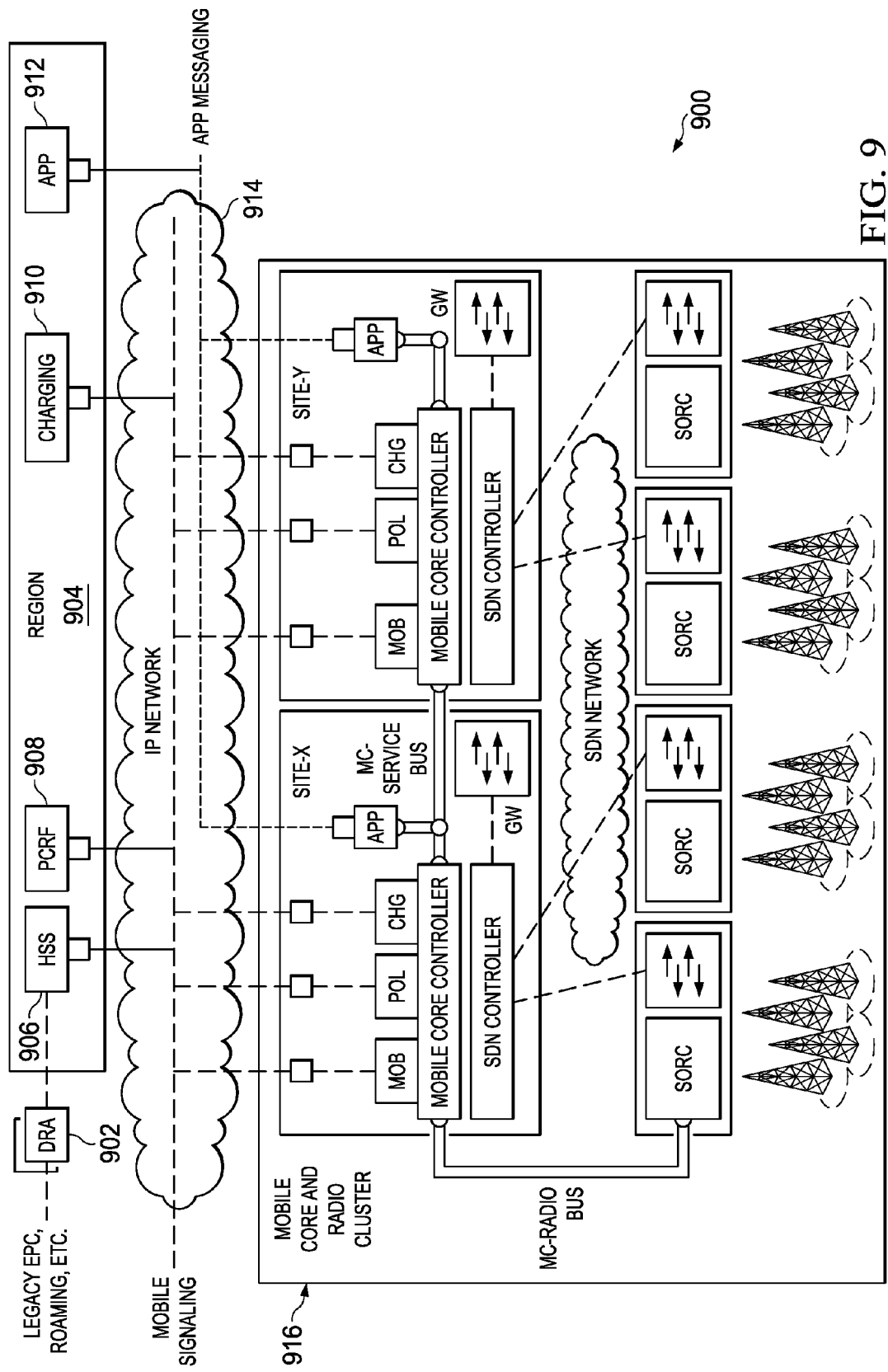
FIG. 9 illustrates an embodiment of a mobile core and radio cluster including a number of radio controllers, e.g., service oriented radio controllers (SORCs), and mobile core sites.

FIG. 9 illustrates an embodiment of a system 900 with a mobile core and radio cluster including a number of radio controllers, e.g., service oriented radio controllers (SORCs), and mobile core sites according to an embodiment. System 900 includes one or more DRAs 902, region 904, IP network 914, a mobile core and radio cluster 916. The mobile core sites in the cluster interconnect to the radio sites via an SDN network. Additionally, the SDN controllers in each domain coordinate using a service bus to agree on the allocation of common gateway (GW) and access network resources to end user sessions. The SDN controller in each mobile core site may be a primary controller for a set of resources.

SORCs in the cluster can expose aspects of a user session such as location, state, consumption of resources, etc., to a third party application. This is accomplished via the service bus between the SORC and the mobile core. The mobile core may also expose session information of a user to third party applications. The mobile core bus (MC-Service Bus) is a parent for the MC-Radio Bus and provides access control, per-topic policy implementation and consolidation of topics that are exposed to third parties. The MC-Radio bus exchanges capabilities with the MC-Service bus and advertises the topics that it publishes. The MC-Service bus publishes all the topics (radio and core) to which a third party application can subscribe.

The mobile core controller interfaces with legacy servers such as a home subscriber server (HSS), policy and charging rules function (PCRF), charging and other servers via representational state transfer (REST) based interfaces.

A distributed mobile core with clustered, elastic sites using function virtualization and hierarchical SDN controllers is provided in various embodiments. Embodiments allow concurrent operation of various distributions.

Figure 10:
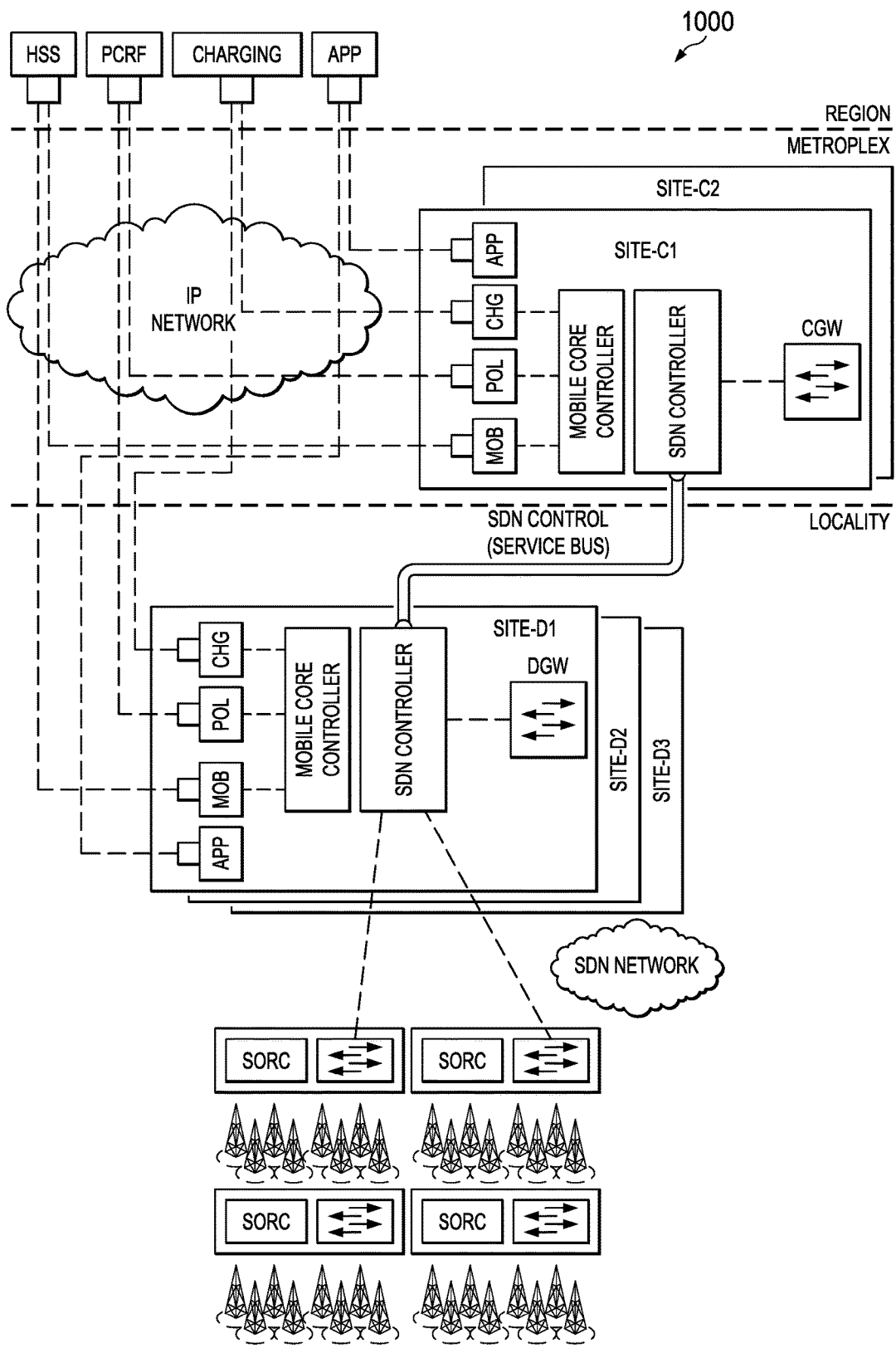
FIG. 10 illustrates an embodiment of the distribution of mobile core functionality across the network.

FIG. 10 is a diagram of a system 1000 that illustrates an embodiment of the distribution of mobile core functionality across the network according to an embodiment. On the left side is the legacy EPC network and on the right is a mobile core with flexible distribution. Multiple mobile core sites that are geographically distributed (e.g., Site-D1/D2/D3 and Site-C1, C2) form a cluster along with the radio sites (SORCs). Connectivity requests from user equipment (UEs) (e.g., Attach/PDN connectivity) are routed by the radio controller (SORC) to the appropriate mobile core based on the international mobile subscriber identify (IMSI), service type, and load information. IMSI and service type information is contained in the request from the UE. Load information of each mobile core/radio site is exchanged via the service bus mechanisms. Each of the sites in the cluster is configured with a network policy that determines how the IMSI, service type and load information is used to handle the service. Each of the sites in this network also publishes.

In various embodiments, this architecture supports geographical distribution of the mobile core with multiple slices operating concurrently and UE requests routed based on IMSI/service type/load. With respect to the centralized control plane and user plane, smartphone services such as VoIP and internet access can establish sessions to a control plane and user plane that is centralized. In FIG. 10, this is realized by the mobile core C1/C2 and the communication gateway (CGW). With respect to the distributed control plane and user plane, services that require low latency and service proxies close to the IP gateway need such a distribution. In FIG. 10, this is realized by the mobile core at D1/D2/D3 and the data gateway (DGW). With respect to the centralized control plane and distributed user plane, services that have minimal control plane and user plane setup, e.g., no mobility support and that are more transactional in nature, may use a centralized control plane, while the user plane is distributed. Examples include IoT and M2M services. In FIG. 10, this is realized by the mobile core at C1/C2 and the gateway at DGW. Control plane Cx requests user plane resources to the local SDN controller. The local SDN controller requests the SDN controller in the distributed site to setup gateway resources.

Figure 11:
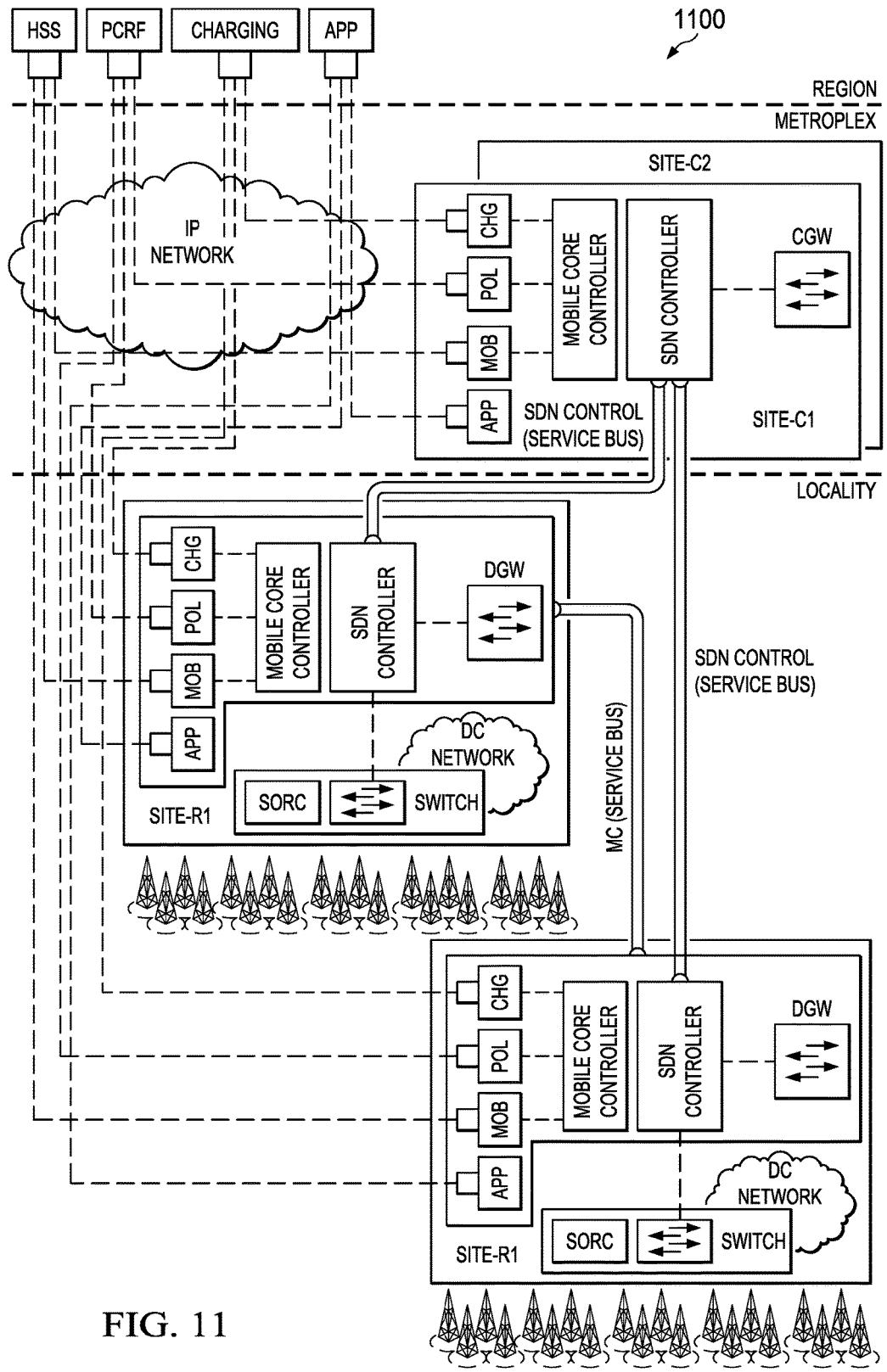
FIG. 11 illustrates an alternative embodiment of FIG. 10.

FIG. 11 is a diagram of a system 1100 that illustrates an alternative embodiment of FIG. 10. With respect to the combined radio and mobile core, the mobile core servers are located at a radio site with the SORC. The SDN network between the radio and mobile core servers are the internal leaf-spine network of a data center. However, they implement abstractions for a packet data network (PDN) connection as in the cases described with respect to FIG. 10 above. A central mobile core can exist concurrently with the other cases in various embodiments.

Figure 12:
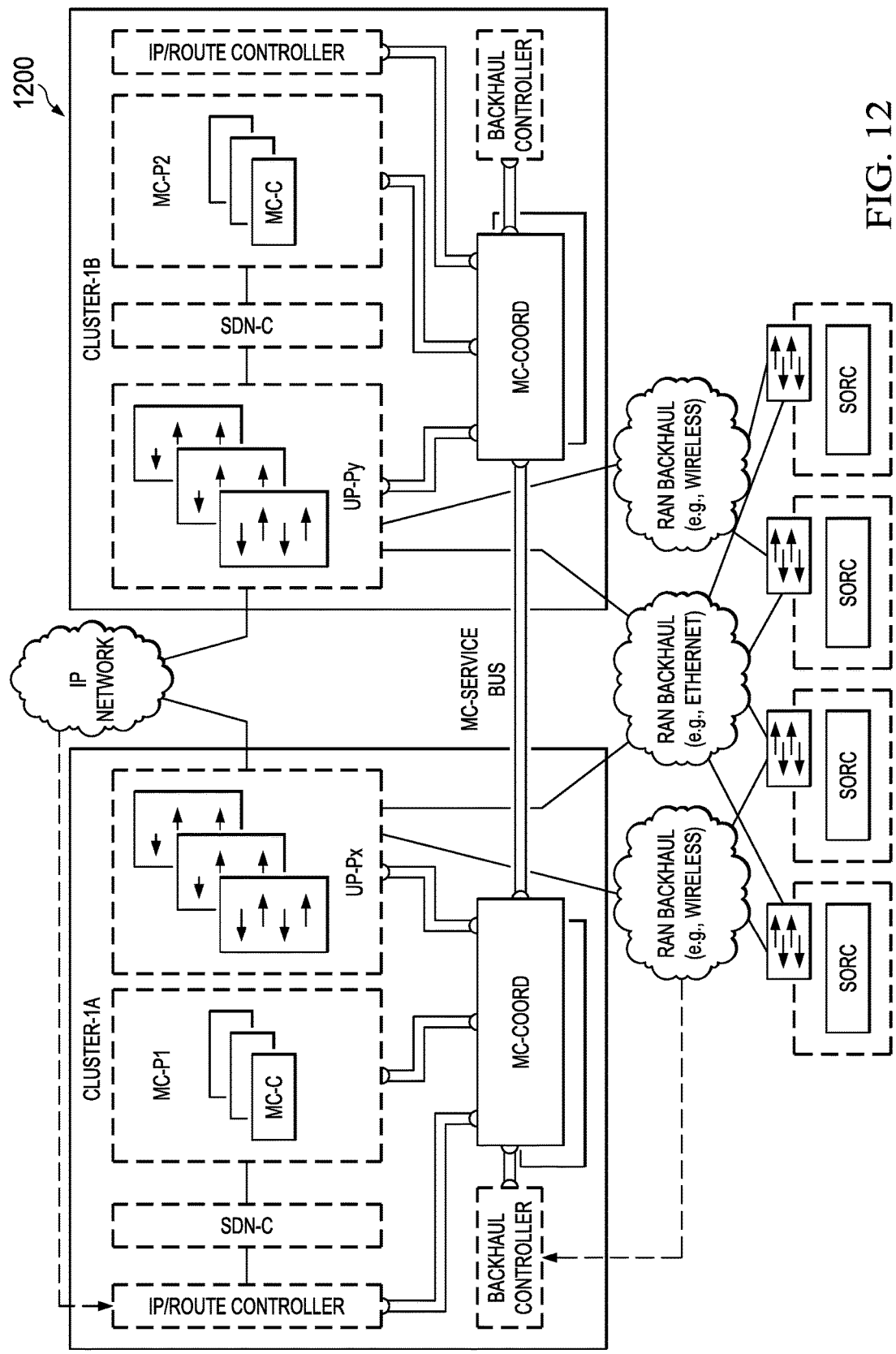
FIG. 12 outlines an embodiment of a mobile core cluster that includes multiple managed resources and sites.

The mobile core manages and sets up multiple resources for a PDN connection, e.g., for session handling, gateway, backhaul and IP network and address resources. FIG. 12 outlines the resources that are managed to support PDN connections with QoS, IP mobility and ultra-high reliability.

FIG. 12 is a diagram of an embodiment of a system 1200 that outlines a mobile core cluster that includes multiple managed resources and sites. These sites may be distributed as shown in FIG. 12. The mobile core coordinator (MC-COORD) coordinates resources, reports events and performs configuration associated with the handling of the PDN connection. In terms of network functions virtualization (NFV) terminology, the MC-COORD may be viewed as an entity that includes functionality of a virtual network function manager (VNFM) and orchestrator. The MC-COORD, however, extends the base capability to include coordination specific to a mobile packet core for handling IP mobility and failover across sites in a cluster.

The MC-COORD includes a forwarding graph containing, e.g., radio backhaul network, gateway, and IP network, for the datapath and controller resources for the session, e.g., MC-controller, SDN controller, IP/route controller, and backhaul controller. The resources that are coordinated may be distributed in multiple mobile core (MC) sites in embodiments. An example is shown in FIG. 13.

Figure 13:
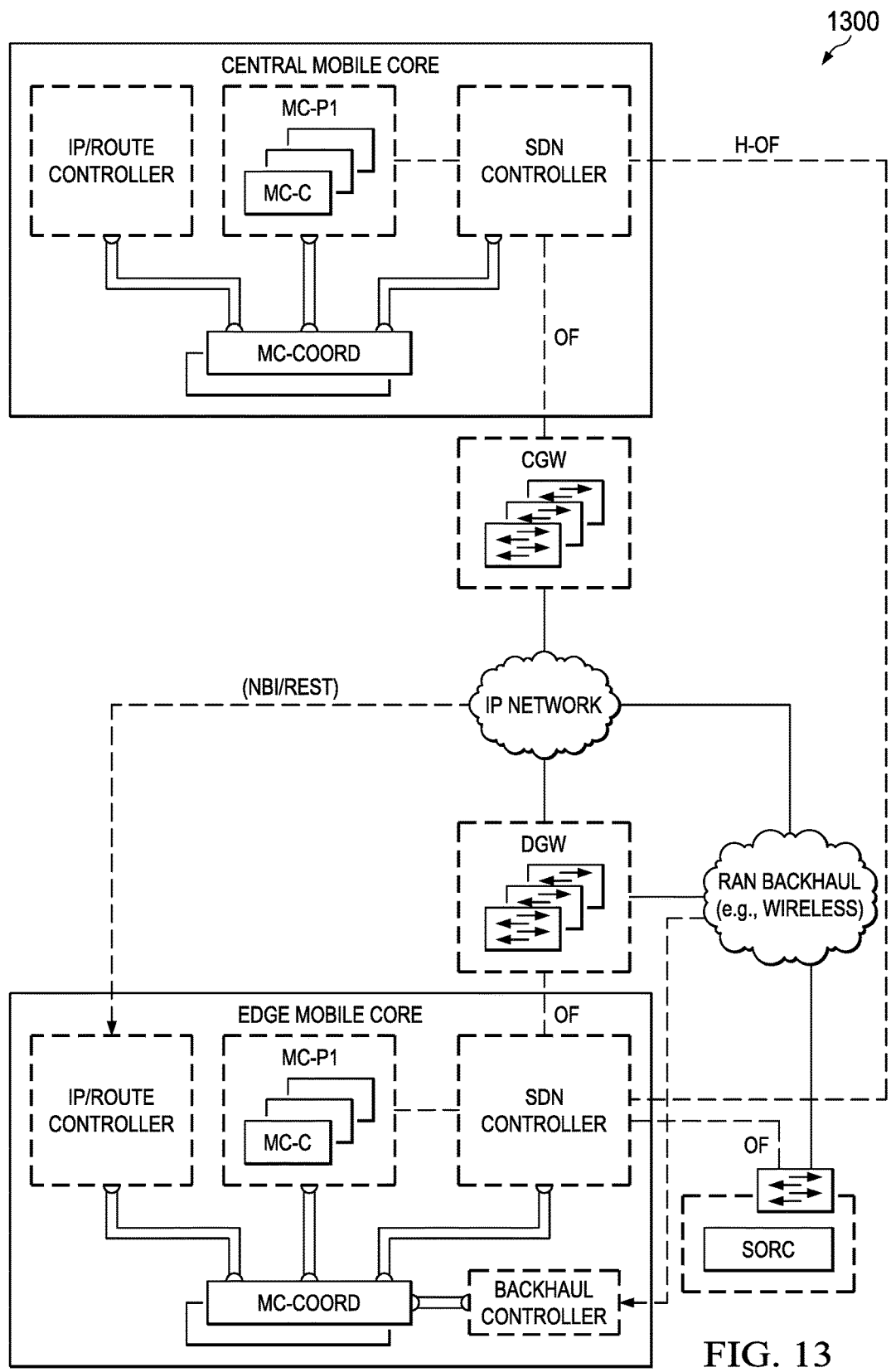
FIG. 13 illustrates an embodiment of a MC distribution where the session control may be handled in a central mobile core and the gateway/PDN resources in an edge mobile core.

FIG. 13 is a diagram of an embodiment of a system 1300 illustrating a MC distribution where the session control may be handled in a central mobile core and the gateway/PDN resources in an edge mobile core according to an embodiment. In an embodiment, session control includes procedures to identify, authenticate, and manage the UE's attachment to the network based on subscribed policies. Session control also includes procedures to maintain the associated connection resources and changes resulting from mobility. FIG. 13 illustrates just one embodiment and other embodiments are contemplated. Routing may be determined according to details described above with respect to FIGS. 9-11.

The SDN controller controls the gateway (UP-xx) resources and switch at SORC using OpenFlow (OF). The SDN controller at the edge publishes the type and number of connection resources (QoS, etc.), along with its eNB transport interface and Gi (IP network) interface. The SDN controller in the central site requests for resources using these abstractions (to add/modify/delete). In embodiments, the SDN controller-SDN controller protocol is similar to a North bound interface (NBI) based on HTTP/REST. In FIG. 13, it is marked as hierarchical-OpenFlow (H-OF).

The route controller includes IP route handling and IP address handling. For IP route handling, routing control protocols (BGP, OSPF) are used to exchange routing and reachability state. During mobility between EPC sites in a cluster, the route controller can reassign the IP address and routes. For IP address handling, the route controller manages the IP address/prefix assigned to the UE.

With respect to the backhaul controller, backhaul networks may be wireless (microwave), Ethernet or other technology. In SDN-implemented backhaul, the controller provides feedback about the state of the network. In a traditional network, the state may be determined by management information, probing, etc.

Figure 14:
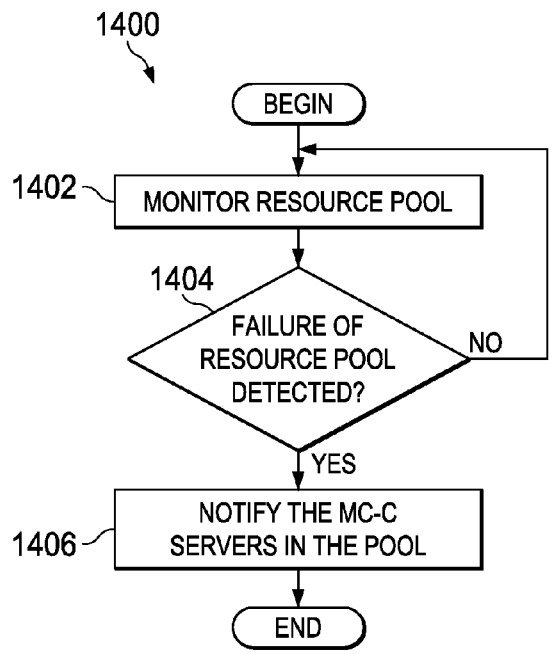
FIG. 14 is a flowchart of an embodiment of a method in a MC-COORD for monitoring a resource pool.

FIG. 14 is a flowchart of an embodiment of a method 1400 in a MC-COORD for monitoring a resource pool. The method 1400 begins at block 1402 where a MC-COORD monitors a resource pool. At block 1404, the MC-COORD determines if a full or partial failure of one of the resources in the resource pool has occurred. If, at block 1404, the MC-COORD determines that no failure has occurred, then the method 1400 proceeds to block 1402. If, at block 1404, the MC-COORD determines a failure, then the method 1400 proceeds to block 1406. At block 1406, the MC-COORD notifies the MC-C servers in the pool, after which, the method 1400 ends.

Figure 15:
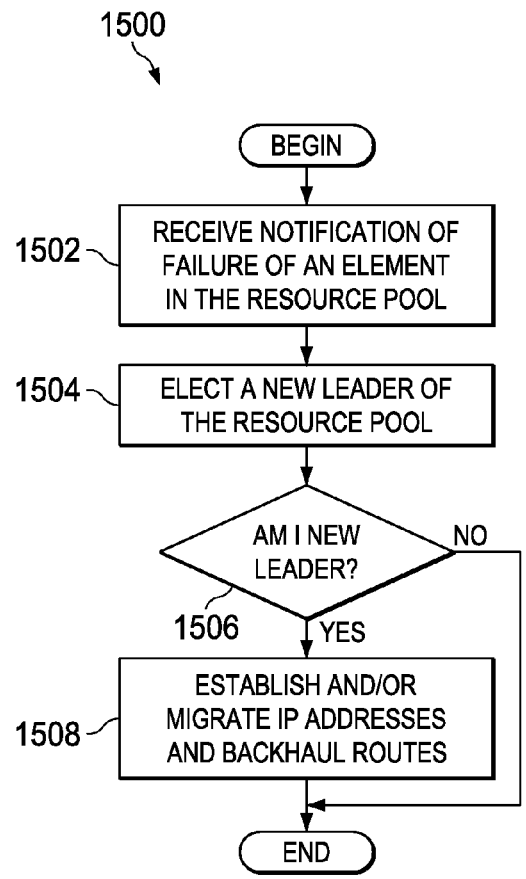
FIG. 15 is a flowchart of an embodiment of a method in a MC-C server for establishing and/or migrating IP addresses and backhaul routes after resource failure.

FIG. 15 is a flowchart of an embodiment of a method 1500 in a MC-C server for establishing and/or migrating IP addresses and backhaul routes after resource failure. The method 1500 begins at block 1502 where the MC-C receives a notification of failure of an element in the resource pool from an MC-COORD. At block 1504, the MC-C communicates with other MC-Cs in the cluster and elects a new leader of the resource pool. At block 1506, the MC-C determines if it is the new leader. If it is not the new leader, then the method 1500 ends. If it is the new leader, then the method 1500 proceeds to block 1508 where the MC-C establishes and/or migrates IP addresses and backhaul routes to new resources, after which, the method 1500 ends.

Figure 16:
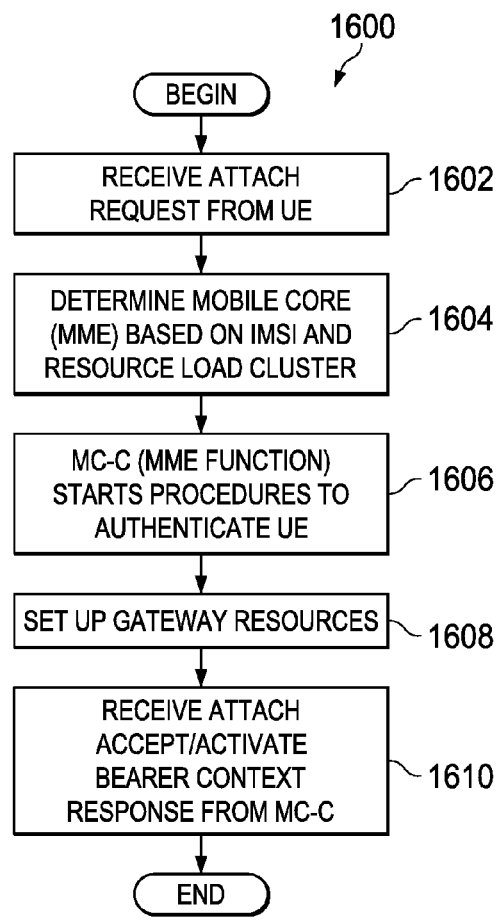
FIG. 16 is a flowchart of an embodiment of a method for initial UE attach.

FIG. 16 is a flowchart of an embodiment of a method 1600 for initial UE attach. The method 1600 begins at block 1602 where the SORC receives an attach request from a UE. At block 1604, the SORC determines a mobile core (MME) based on the IMSI and resource load in the cluster. It should be noted that resource synchronization has already occurred prior to the SORC determining a mobile core. At block 1606, the SORC instructs the MIC-C (MME function) to start procedures to authenticate the UE. At block 1608, after the MC-C authenticates the UE, the MC-C sets up gateway resources (e.g., UP nodes in FIG. 6). At block 1610, the SORC receives an Attach Accept/Activate Bearer context response from the MC-C. Following bearer context activation, the PDN connection is setup and ready for data transmission. The method 1600 then ends.

Figure 17:
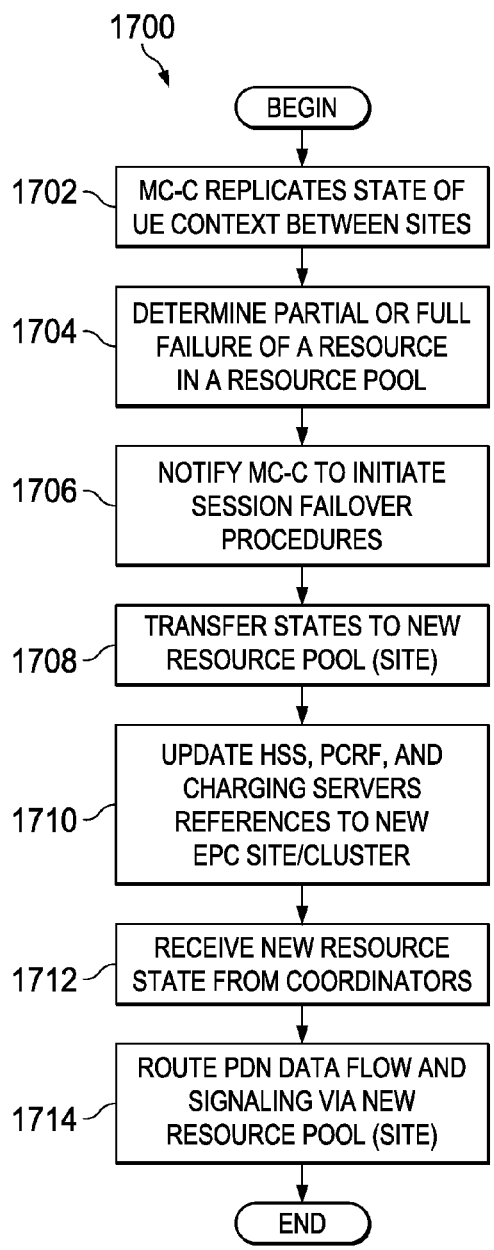
FIG. 17 is a flowchart of an embodiment of a method for failover of sessions with replicated context.

FIG. 17 is a flowchart of an embodiment of a method 1700 for failover of sessions with replicated context. The method 1700 begins at block 1702 where the MC-C replicates the state of the UE context between sites. At block 1704, the MC-COORD in each site monitor the state and at least one of the MC-COORD determines a partial or full failure of a resource in the resource pool. At block 1706, a notification from the MC-COORD to the MC-C is sent instructing the MC-C to initiate session failover procedures. At block 1708, the SORC transfers the states to the new resource pool. The gateway states at the MC site and the radio are modified by the SDN controller to handle PDN. The route controller syncs with the failing resource pool if the route controller in the failing resource pool is active and injects route to upstream routers to handle IP address of UE's reliable PDN. The MC-C signals applications subscribed of migration, address, etc. Following completion of connection setup, a finalize relocation message is sent to the application. At block 1710, the MC-C in the new resource pool updates the HSS, the PCRF, and the charging servers references to the new EPC site/cluster. At block 1712, the SORC receives notifications from the new coordinators of the new resource state. At block 1714, the SORC routes new control and data to the new resource pool, after which, the method 1700 ends.

Figure 18:
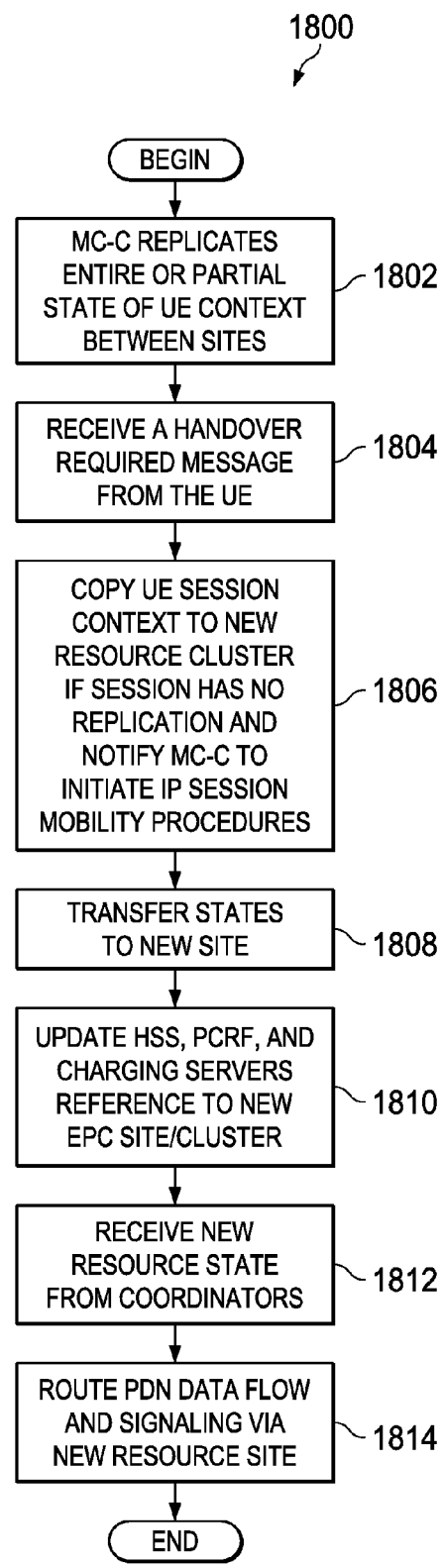
FIG. 18 is a flowchart of an embodiment of a method for intra-cluster mobility of a UE.

FIG. 18 is a flowchart of an embodiment of a method 1800 for intra-cluster mobility of a UE. The method 1800 begins at block 1802 where the MC-C replicates an entire or partial state of UE context between sites (e.g., between cluster-1A and cluster-1B in FIG. 1, where cluster-1A and cluster-1B are sites). At block 1804, the SORC receives a handover required message from the UE. At block 1806, the MC-Cs copy UE session context to the new resource site if the session has not replication and, in an embodiment, for all cases, the SORC notifies the MC-Cs to initiate IP session mobility procedures. At block 1808, the MC-Cs transfer the UE states to the new site. In an embodiment, the PDN connection and bearer state is transferred such that gateway states (at the MC site and the radio) are modified by the SDN controller to handle PDN, the rout controllers in the destination site synchronizes with the origination site and injects route to upstream routers to handle IP address of UE's reliable PDN, and the MC-C in the destination site signals applications subscribed of migration, address, etc. Following completion of connection setup, a finalize relocation message is sent to the application. At block 1810, the MC-C in the destination site updates the HSS, the PCRF, and the charging servers to the new EPC site/cluster. At block 1812, the SORC receives new resource state from the coordinators (e.g., MC-COORD). At block 1814, the SORC routes PDN data flow and signaling via the new resource site, after which, the method 1800 ends.

Figure 19:
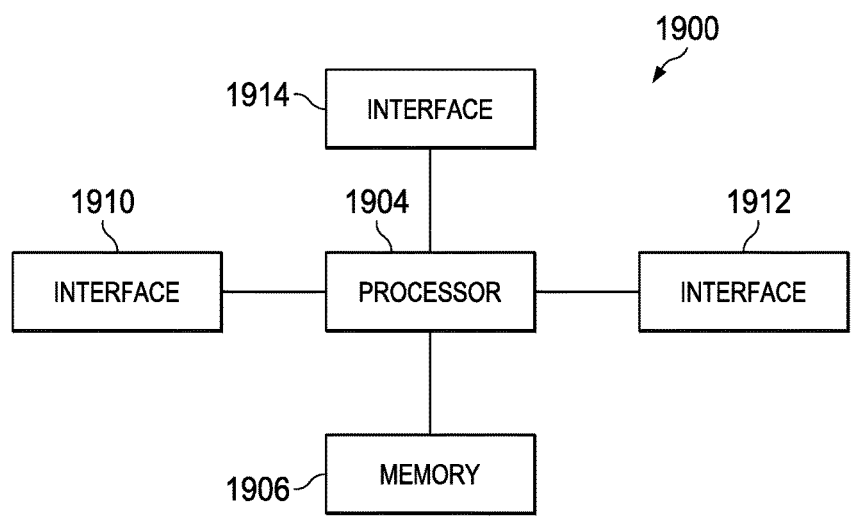
FIG. 19 illustrates a block diagram of an embodiment processing system for performing methods described herein, which may be installed in a host device.

FIG. 19 illustrates a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown in FIG. 19. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in FIG. 19, such as long term storage (e.g., non-volatile memory, etc.).

In some embodiments, the processing system 1900 is included in a network device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1910, 1912, 1914 connects the processing system 1900 to a transceiver adapted to transmit and receive signaling over the telecommunications network.

Figure 20:
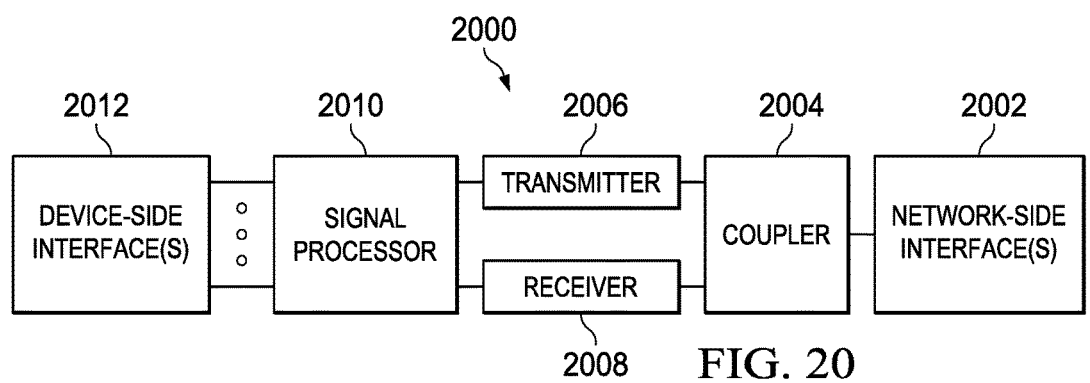
FIG. 20 illustrates a block diagram of a transceiver adapted to transmit and receive signaling over a telecommunications network.

FIG. 20 illustrates a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 1900, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, a method in a network component for cluster and session handling includes receiving, by a mobile core controller (MC-C) in a first resource pool in a cluster of resources, an attach request from a service-oriented radio controller (SORC) for a packet data network (PDN) connection for a user equipment (UE), the MC-C and the first resource pool selected by the SORC according to a UE address, a load experienced by the cluster of resources, and at least one operator policy; configuring, by the MC-C, session control and gateway resources for a session for the UE, the selection of session control received by the MC-C from the SORC; negotiating, by the MC-C, with a follower site to determine state information for a bearer context of the UE, the follower site comprising a second resource pool belonging to the cluster of resources; synchronizing, by the MC-C, the state information with follower sites when a state is agreed upon by at least some of the follower sites; and forming an availability group according to a set of servers that hold replicated state information for the UE. The method may also include, responsive to a trigger, moving the session of the UE from the first resource pool to the second resource pool. In an embodiment, the trigger includes a handover request from the UE. In an embodiment, the trigger includes at least a partial failure of at least one resource in the first resource pool. In an embodiment, moving a session of the UE from the first resource pool to the second resource pool includes copying the session context for the UE from the first resource pool to the second resource pool. In an embodiment, moving the session of the UE from the first resource pool to the second resource pool includes modifying gateway states with a software defined networking (SDN) controller in the second resource pool to handle PDN. In an embodiment, moving the session of the UE from the first resource pool to the second resource pool includes signaling, with an MC-C in the second resource pool, an application utilized by the UE in the session of the migration. In an embodiment, the MC-C in the second resource pool provides the application with at least one of relocation information and resource-state information. In an embodiment, the resource-state information includes session specific information on path congestion or path failure.

In an embodiment, a mobile core controller (MC-C) in a first resource pool in a cluster of resources includes a processor and a non-transitory computer readable storage medium storing programming for execution by the processor, the programming including instructions to: receive an attach request from a service-oriented radio controller (SORC) for a packet data network (PDN) connection for a user equipment (UE), the MC-C deployed in a first resource pool in a cluster of resources, the MC-C and the first resource pool selected by the SORC according to a UE address, a load experienced by the cluster of resources, and at least one operator policy; configure session control and gateway resources for a session for the UE, the selection of session control received by the MC-C from the SORC; negotiate with a follower site to determine state information for a bearer context of the UE, the follower site including a second resource pool belonging to the cluster of resources; synchronize the state information with follower sites when a state is agreed upon by at least some of the follower sites; and form an availability group according to a set of servers that hold replicated state information for the UE. In an embodiment, the programming further includes instructions to move, responsive to a trigger, the session of the UE from the first resource pool to the second resource pool. In an embodiment, the trigger includes a handover request from the UE. In an embodiment, the trigger includes at least a partial failure of at least one resource in the first resource pool. In an embodiment, the instructions to move the session of the UE from the first resource pool to the second resource pool includes copying the session context for the UE from the first resource pool to the second resource pool. In an embodiment, the instructions to move the session of the UE from the first resource pool to the second resource pool includes modifying gateway states with a software defined networking (SDN) controller in the second resource pool to handle PDN. In an embodiment, the instructions to move the session of the UE from the first resource pool to the second resource pool includes signaling, with an MC-C in the second resource pool, an application utilized by the UE in the session of the migration. In an embodiment, the MC-C in the second resource pool provides the application with at least one of relocation information and resource-state information. In an embodiment, the resource-state information includes session specific information on path congestion or path failure.

In an embodiment, a method in a network component for evolved packet core (EPC) cluster and session handling includes receiving, at the network component, an attach request for a packet data network (PDN) connection from a user equipment (UE); determining, by the network component, resource load for resources in a cluster of resources; determining a pool of resources to serve the UE according to the resource load, a location of the UE, and at least one operator policy; selecting session control for the PDN connection; identifying a mobile core controller (MC-C) from the determined pool or resources; sending the selection control to the MC-C; and instructing the MC-C to initiate procedures to authenticate the UE, set up gateway resources from the pool of resources, and perform UE context replication among the pool of resources according to the pool of resources and the session control.

In an embodiment, a network component includes a processor and a non-transitory computer readable storage medium storing programming for execution by the processor, the programming including instructions to: receive an attach request for a packet data network (PDN) connection from a user equipment (UE); determine a resource load for resources in a cluster of resources; determine a pool of resources to serve the UE according to the resource load, a location of the UE, and at least one operator policy; select session control for the PDN connection; identify a mobile core controller (MC-C) from the determined pool or resources; send the selection control to the MC-C; and instruct the MC-C to initiate procedures to authenticate the UE, set up gateway resources from the pool of resources, and perform UE context replication among the pool of resources according to the pool of resources and the session control.

The following references are related to subject matter of the present application. Each of these references is incorporated herein by reference in its entirety:

[1]• 3GPP TS 24.301 v 13.0.0, 3rd Generation Partnership Project; Technical Specification Group Core Network and Terminals; Non-Access-Stratum (NAS) protocol for Evolved Packet System (EPS); Stage 3 (2014-12).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a network component for cluster and session handling comprising:
   receiving, by a mobile core controller (MC-C) in a first resource pool in a cluster of resources, an attach request from a service-oriented radio controller (SORC) for a packet data network (PDN) connection for a user equipment (UE), the MC-C and the first resource pool selected by the SORC according to a UE address, a load experienced by the cluster of resources, and at least one operator policy;
   configuring, by the MC-C, session control and gateway resources for a session for the UE, a selection of the session control received by the MC-C from the SORC;
   negotiating, by the MC-C, with a follower site to determine state information for a bearer context of the UE, the follower site comprising a second resource pool belonging to the cluster of resources;
   synchronizing, by the MC-C, the state information with follower sites when a state is agreed upon by at least some of the follower sites; and
   forming an availability group according to a set of servers that hold replicated state information for the UE.

2. The method of claim 1, further comprising:
   responsive to a trigger, migrating the session of the UE from the first resource pool to the second resource pool.

3. The method of claim 2, wherein the trigger comprises a handover request from the UE.

4. The method of claim 2, wherein the trigger comprises at least a partial failure of at least one resource in the first resource pool.

5. The method of claim 2, wherein moving a session of the UE from the first resource pool to the second resource pool comprises copying a session context for the UE from the first resource pool to the second resource pool.

6. The method of claim 2, wherein moving the session of the UE from the first resource pool to the second resource pool comprises modifying gateway states with a software defined networking (SDN) controller in the second resource pool to handle PDN.

7. The method of claim 2, wherein moving the session of the UE from the first resource pool to the second resource pool comprises signaling, with an MC-C in the second resource pool, an application utilized by the UE in the session of the migrating.

8. The method of claim 7, wherein the MC-C in the second resource pool provides the application with at least one of relocation information and resource-state information.

9. The method of claim 8, wherein the resource-state information comprises session specific information on path congestion or path failure.

10. A mobile core controller (MC-C) in a first resource pool in a cluster of resources, the MC-C comprising:
    a processor; and
    a non-transitory computer readable storage medium storing programming for execution by the processor, the programming including instructions to:
    receive an attach request from a service-oriented radio controller (SORC) for a packet data network (PDN) connection for a user equipment (UE), the MC-C deployed in a first resource pool in a cluster of resources, the MC-C and the first resource pool selected by the SORC according to a UE address, a load experienced by the cluster of resources, and at least one operator policy;
    configure session control and gateway resources for a session for the UE, a selection of the session control received by the MC-C from the SORC;
    negotiate with a follower site to determine state information for a bearer context of the UE, the follower site comprising a second resource pool belonging to the cluster of resources;
    synchronize the state information with follower sites when a state is agreed upon by at least some of the follower sites; and
    form an availability group according to a set of servers that hold replicated state information for the UE.

11. The MC-C of claim 10, wherein the programming further comprises instructions to:
    migrate, responsive to a trigger, the session of the UE from the first resource pool to the second resource pool.

12. The MC-C of claim 11, wherein the trigger comprises a handover request from the UE.

13. The MC-C of claim 11, wherein the trigger comprises at least a partial failure of at least one resource in the first resource pool.

14. The MC-C of claim 11, wherein the instructions to move the session of the UE from the first resource pool to the second resource pool comprises copying a session context for the UE from the first resource pool to the second resource pool.

15. The MC-C of claim 11, wherein the instructions to move the session of the UE from the first resource pool to the second resource pool comprises modifying gateway states with a software defined networking (SDN) controller in the second resource pool to handle PDN.

16. The MC-C of claim 11, wherein the instructions to move the session of the UE from the first resource pool to the second resource pool comprises signaling, with an MC-C in the second resource pool, an application utilized by the UE in the session of the migrate.

17. The MC-C of claim 16, wherein the MC-C in the second resource pool provides the application with at least one of relocation information and resource-state information.

18. The MC-C of claim 17, wherein the resource-state information comprises session specific information on path congestion or path failure.

19. A method in a network component for evolved packet core (EPC) cluster and session handling comprising:
    receiving, at the network component, an attach request for a packet data network (PDN) connection from a user equipment (UE);
    determining, by the network component, resource load for resources in a cluster of resources;

determining a pool of resources to serve the UE according to the resource load, a location of the UE, and at least one operator policy;
selecting a session control for the PDN connection;
identifying a mobile core controller (MC-C) from the determined pool or resources;
sending the session control to the MC-C; and
instructing the MC-C to initiate procedures to authenticate the UE, set up gateway resources from the pool of resources, and perform UE context replication among the pool of resources according to the pool of resources and the session control.

20. A network component comprising:
a processor; and
a non-transitory computer readable storage medium storing programming for execution by the processor, the programming including instructions to:
receive an attach request for a packet data network (PDN) connection from a user equipment (UE);
determine a resource load for resources in a cluster of resources;
determine a pool of resources to serve the UE according to the resource load, a location of the UE, and at least one operator policy;
select session control for the PDN connection;
identify a mobile core controller (MC-C) from the determined pool or resources;
send the session control to the MC-C; and
instruct the MC-C to initiate procedures to authenticate the UE, set up gateway resources from the pool of resources, and perform UE context replication among the pool of resources according to the pool of resources and the session control.

* * * * *